Figure 1:
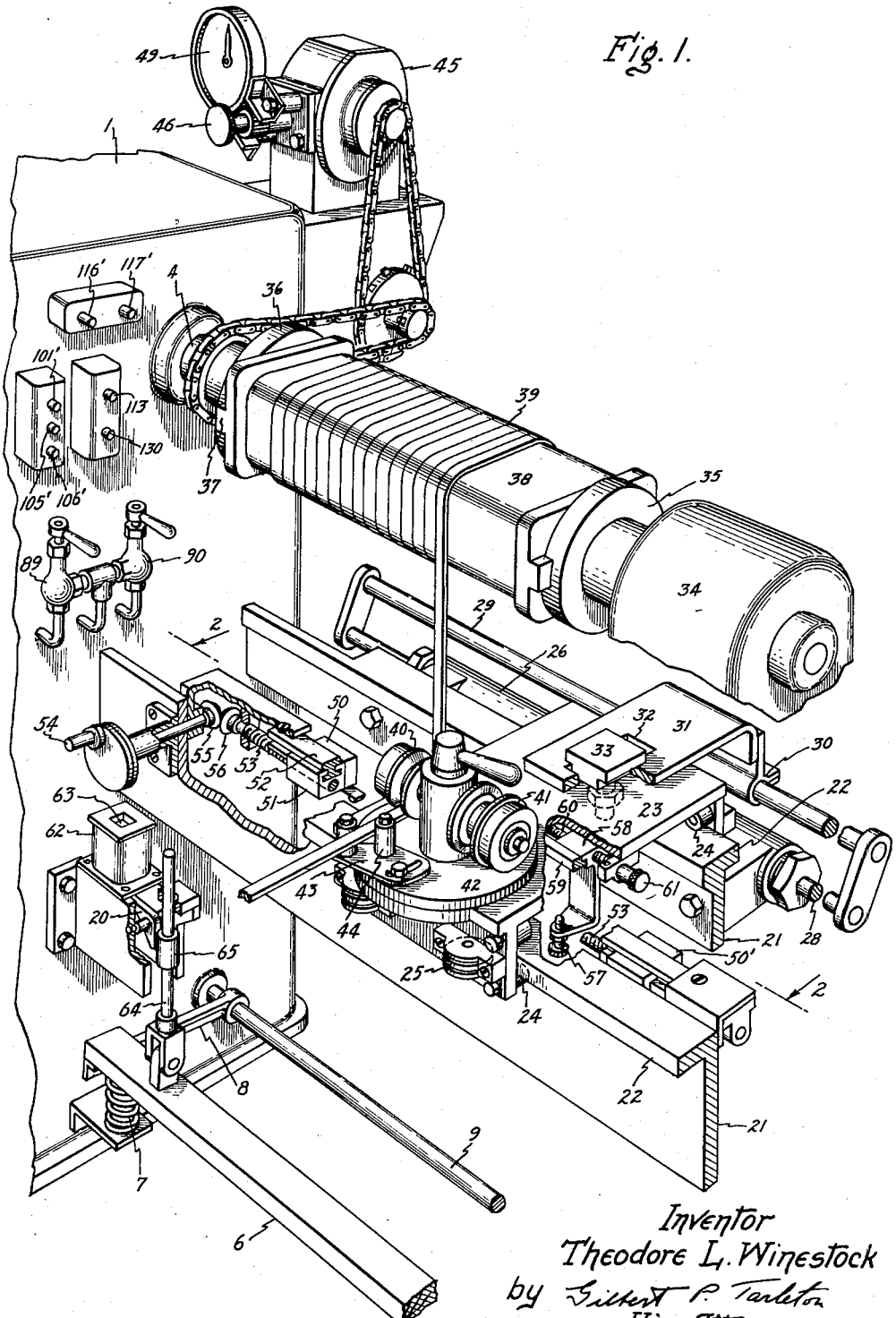

Aug. 2, 1960          T. L. WINESTOCK          2,947,487
            MACHINE WITH HYDRAULICALLY ACTUATED CARRIAGE
Filed April 29, 1955                           3 Sheets-Sheet 1

Inventor
Theodore L. Winestock
by Gilbert P. Tarleton
    His Attorney.

Aug. 2, 1960  T. L. WINESTOCK  2,947,487
MACHINE WITH HYDRAULICALLY ACTUATED CARRIAGE
Filed April 29, 1955  3 Sheets-Sheet 2
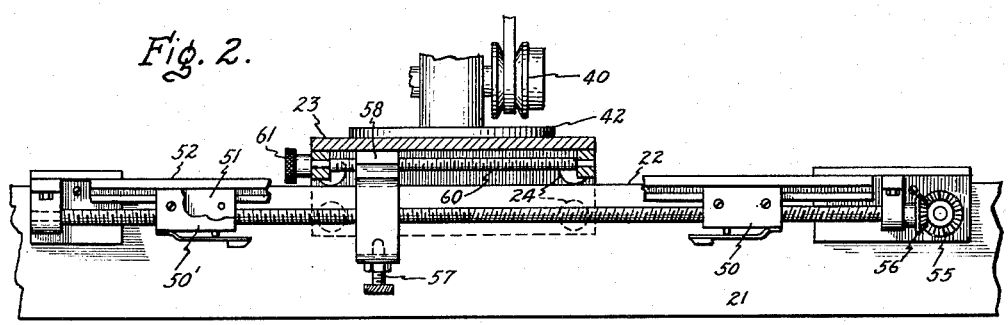
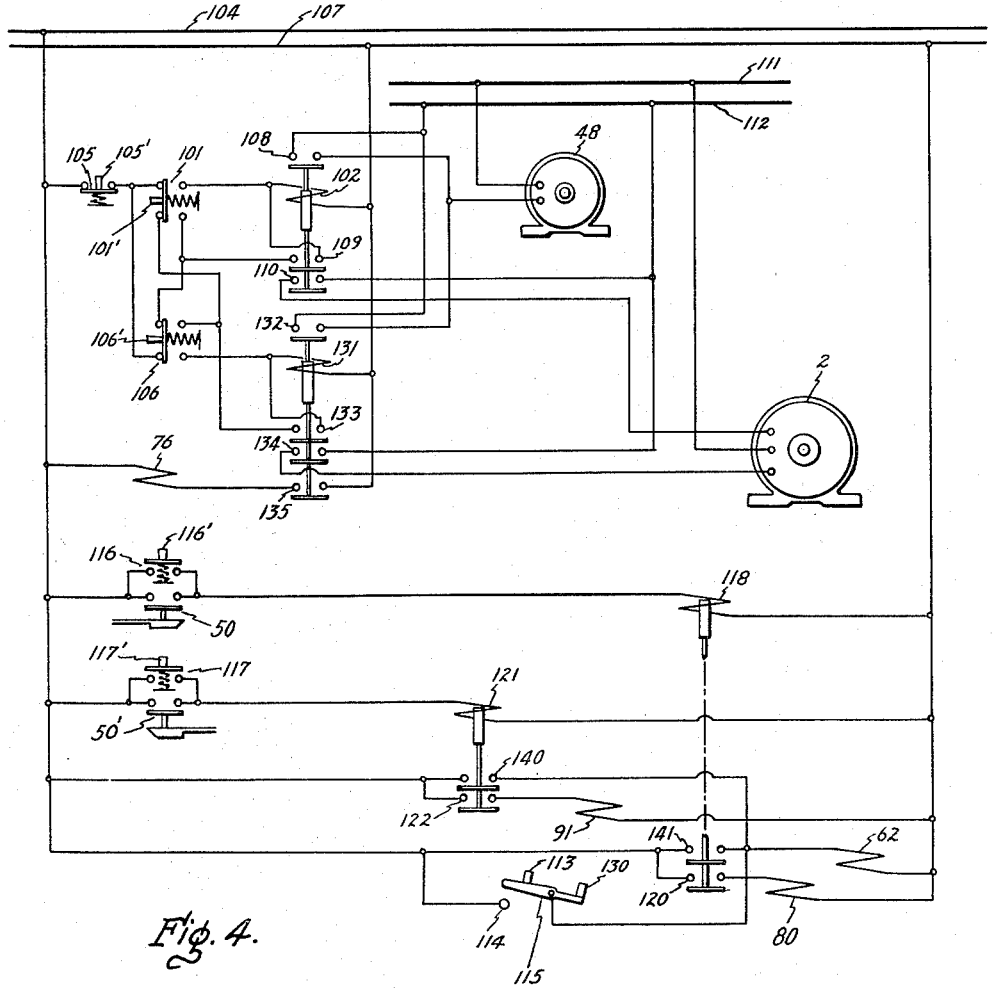
Inventor
Theodore L. Winestock,
by Gilbert P. Tarleton
His Attorney.

Inventor
Theodore L. Winestock,
by Gilbert P. Tarleton
His Attorney.

United States Patent Office 2,947,487
Patented Aug. 2, 1960

2,947,487

MACHINE WITH HYDRAULICALLY ACTUATED CARRIAGE

Theodore L. Winestock, Pittsfield, Mass., assignor to General Electric Company, a corporation of New York Filed Apr. 29, 1955, Ser. No. 504,951

11 Claims. (Cl. 242—9)

This invention relates to a machine having a hydraulically actuated carriage, and more particularly, to a machine having a rotary spindle and a hydraulically actuated carriage movable parallel to the axis of said spindle.

The preferred form of my invention is illustrated as comprising a machine for winding the electrical coils of a transformer. However, as will be more clear hereinafter, my invention is useful in machines other than machines for winding transformer electrical coils.

In some prior art winding machines the spindle and carriage are simultaneously driven through a gear train and other mechanical means. Different turns of the spindle per unit distance of travel of the carriage is accomplished by providing the machine with different gear trains. The necessity for carrying different gear trains increases the initial cost of the machine, and increases the upkeep cost of the machine due to the relatively large number of parts which may be damaged due to careless handling and which require maintenance such as lubrication.

Additionally, the different number of spindle turns per unit distance of carriage travel is limited by the different number of gear trains for which the machine was originally designed. A particular number of spindle turns per unit distance of carriage travel for which no gear train was provided cannot be produced by the machine. That is, the range of number of spindle turns per unit distance of carriage travel is limited in said prior art machines.

Before starting the first layer of a coil it is necessary to first properly align the carriage wire guide wheels with the winding arbor. In said prior art machines since the spindle and carriage are interconnected and simultaneously driven through a gear train and other mechanical means, the arbor rotates while the carriage is being moved for alignment with respect to the arbor. This means that it is not convenient to connect the reel of electrical conductor to the winding arbor until after the carriage is first properly aligned with respect to the arbor. The making of adjustments after commencement of or during the winding operation is likewise inconvenient since the carriage cannot be moved without also rotating the arbor. The aforesaid inconveniences as well as the necessity for changing gear trains increases the amount of time the operator must devote towards setting up and adjusting the machine for proper winding.

At the end of any single winding layer it is necessary to reverse the carriage with as little dwell or delay as possible in order to prevent piling of the turns at the adjacent ends of two immediately succeeding layers. Said dwell or delay and said consequent piling of the end turns is difficult to avoid in prior art machines, except at high cost, due to backlash inherent in gear trains and said other mechanical means.

It is an object of this invention to provide a winding machine which will overcome the disadvantages of the heretofore discussed prior art winding machines.

It is a further object of this invention to provide a winding machine which has a minimum number of moving parts, and low initial and upkeep cost.

It is a further object of this invention to provide a winding machine which has a wider range of number of spindle turns per unit distance of carriage travel than available in prior art winding machines.

It is a further object of this invention to provide a winding machine in which the carriage can be moved independently of rotation of the spindle.

It is a further object of this invention to provide a winding machine which is more convenient and requires less time to set up and adjust than prior art winding machines.

It is a further object of this invention to provide a winding machine which has practically no dwell or delay during reversal thereof.

In my invention the winding machine is provided with a hydraulically driven carriage. The hydraulic system employs a metering pump which is driven by the spindle. The quantity of fluid circulated by the metering pump per spindle revolution can be very easily adjusted over a very wide range merely by adjusting a suitable control on the metering pump. This means that a very wide range of number of spindle turns per unit distance of carriage travel can be obtained. Furthermore, by the utilization of a hydraulic system the number of moving parts can be reduced over that required in the prior art mechanically or gear driven carriages whereby the machine is low in initial and upkeep cost.

Also, in my invention the hydraulic system is kept under pressure by a pressure pump independent of operation of the metering pump. This means that the carriage can be moved by the pressure pump merely by operation of suitable valves slowly or rapidly at any time with or without rotation of the spindle. Such an arrangement makes alignment, set up, and adjustment of the machine very convenient and less time-consuming than in prior art machines.

Furthermore, since a liquid is practically incompressible, in my invention the carriage can be reversed with practically no delay or dwell by actuation of an appropriate electrically operated hydraulic valve. This means that piling of the end turns of two immediately adjacent layers is prohibited at a very low cost.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings.

Figure 3:
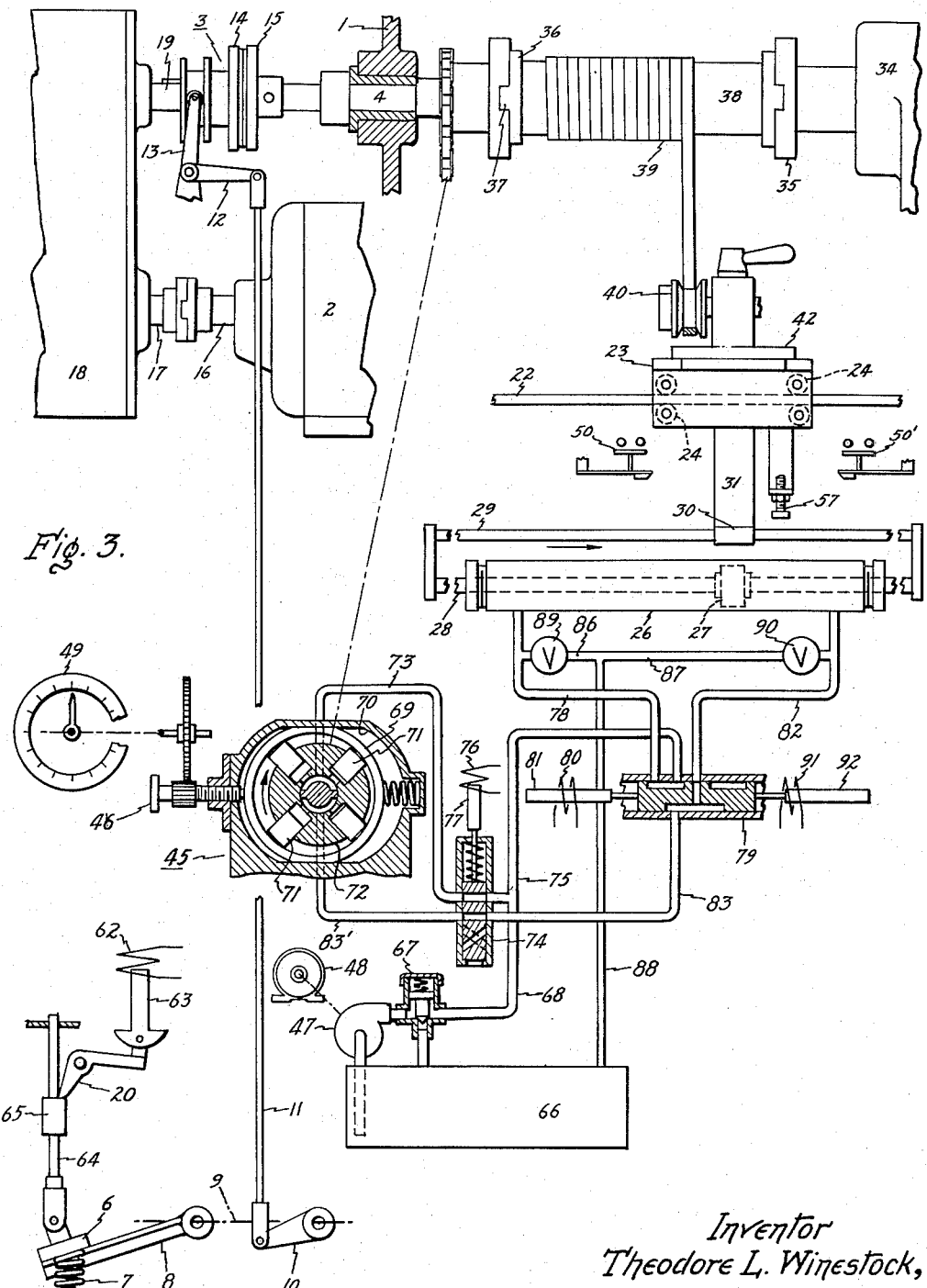

In the drawings, Fig. 1 is a partly broken away perspective view of a preferred form of my invention. Fig. 2 is a sectional view of my preferred form of invention taken along the lines 2—2 of Fig. 1. Fig. 3 is a diagrammatic illustration of the hydraulic system utilized in my preferred form of invention. Fig. 4 is a diagrammatic illustration of the electrical control circuit used in my preferred form of invention. Like reference numerals will be used throughout Figs. 1 to 4 to indicate identical parts.

Referring now particularly to Figs. 1 and 3, shown therein is a winding machine comprising a vertically disposed housing 1 containing an electric driving motor 2 and a clutch 3 as well as other parts of the machine to be described hereinafter. The electric driving motor 2 is capable of being operated in opposite directions, and rotatably journaled within a side wall of housing 1 is a spindle 4. Depression of a clutch pedal 6, which is biased upwardly by a spring 7, causes downward movement of an arm 8, counterclockwise rotation of a shaft 9, and downward movement of an arm 10. Downward movement of arm 10 causes downward movement of a rod 11, and clockwise rotation of a pair of arms 12 and 13. When the arms 12 and 13 are rotated in a clockwise direction an axially movable clutch plate 14 is caused to engage an axially immovable clutch plate 15 whereby rotary motion is imparted to the spindle 4. As will be obvious to those skilled in the art, the motor shaft 16 is coupled to a shaft 17 which in turn is coupled by suitable (not shown) mechanical means contained within an enclosure 18 to the shaft 19 which carries the axially movable clutch plate 14. In Fig. 3 a clutch latch 20 is shown in its clutch-locked-in or engaged position whereby when the pedal 6 is depressed to engage the clutch 3, the clutch 3 will remain in the engaged position after the operator's foot is removed from the pedal 6. In the Fig. 1 solenoid energized position of clutch latch 20 when the operator moves his foot from the pedal 6 the spring 7 will drive pedal 6 upwardly and result in disengagement of the clutch 3.

The winding machine also comprises a horizontally disposed bed 21 having a pair of carriage guide ways 22. A carriage 23 is slidably guided along the ways 22 by suitable roller bearings 24 and 25 mounted on the carriage 23. The carriage 23 is moved along the ways 22 by a positive displacement hydraulic actuator comprising a hydraulic cylinder 26 having a double acting piston 27 therein and a piston rod 28 extending from the opposite ends thereof. Cylinder 26 has a uniform internal diameter and the portions of piston rod 82 disposed on opposite sides of piston 27 have equal and uniform external dimensions. Opposite ends of the piston rod 28 are connected to the oposite ends of a rod 29 disposed parallel to the piston rod 28. A sleeve 30 connects a plate 31 to the rod 29. The plate 31 is superposed with respect to the carriage 23 and has a rectangular slot 32 formed therein. Rectangular slot 32 embraces a rectangular lug 33 connected to the carriage 23 for the purpose of ensuring that movement of the piston rod 28 will result in true parallel movement of the carriage 23 with respect thereto without any binding on the ways 22.

A tailstock 34 has a tailstock plate 35 connected thereto and the spindle 4 has a similar plate 36 connected thereto. Opposite facing sides of the plates 35 and 36 have diametrically extending grooves formed therein adapted to receive tongues 37 formed on opposite ends of a winding form or arbor 38. An electrical conductor or wire 39 in being wound on the winding form or arbor 38 passes underneath and around either one of two wire guide wheels 40 and 41 carried by a rotatable turret 42 mounted on the carriage 23. In the position illustrated in Figs. 1 and 3 the smaller wire guide wheel 40 is guiding the conductor 39. However, the turret 42 can be rotated 180° from the illustrated position whereby the larger guide wheel 41 will be properly positioned to guide a larger size electrical conductor or wire. The turret 42 has a plate 43 adjustably mounted thereon. The plate 43 carries a pair of rollers 44 for the purpose of laterally guiding the conductor 39.

Mounted on the housing 1 is a metering pump 45 which is simultaneously driven with the spindle 4 by a sprocket wheel and chain or other mechanical interconnections therebetween. The quantity of fluid per revolution of the spindle 4 circulated in the hydraulic system by the metering pump 45 can be accurately adjusted by a metering pump control knob 46. The hydraulic system is kept under pressure by a hydraulic pressure pump 47 driven by an electric motor 48. As will be explained in detail hereinafter, the pump motor 48 is driven independently of rotation of the spindle 4. Actuation of the carriage 23 is accomplished by metered circulation of the fluid from out of one end of the hydraulic cylinder 26 and into the other end thereof, and the hydraulic pressure pump 47 merely keeps the hydraulic system under a predetermined pressure except in one instance to be described hereinafter. A dial 49 adjacent the metering pump 45 is calibrated to indicate the setting of the control knob 46, such as in turns of the arbor 38 per unit distance of travel of carriage 23.

Referring now also to Fig. 2, a winding layer length is determined by a pair of electrical limit switches 50 and 50' mounted inside of the opposite sides of the bed 21 beneath the carriage 23. The limit switches 50 and 50' are mounted on a pair of limit switch guide blocks 51 which in turn are guided towards and away from each other along a limit switch guide way 52 carried by one of the sides of the bed 21. The limit switch guide blocks 51 have internally threaded bores formed therein and are moved towards and away from each other along the guide way 52 by an externally threaded rod 53. The rod 53 is oppositively threaded at its opposite ends whereby when rod 53 is rotated in one direction the limit switches 50 and 50' will be moved towards each other, and when the rod 53 is rotated in an opposite direction the limit switches 50 and 50' will be moved away from each other. Rotary movement is imparted to the threaded rod 53 by a crank handle 54, actuation of which causes rotation of a gear 55 as well as a gear 56 mounted on one end of the rod 53. At oposite ends of a winding layer the limit switches 50 and 50' are actuated by a limit switch trip set screw 57 carried by and mounted beneath the carriage 23. Set screw 57 is guided along the carriage 23 by a guide block 58 cooperating with a guide way 59. The guide block 58 has an internally threaded bore formed therein which cooperates with an externally threaded rod 60 which can be rotated by manipulation of a knob 61. Accordingly, the set screw 57 is adjustable in a sidewise direction as well as in up and down direction. As will be more clear hereinafter, actuation of the limit switches 50 and 50' stops movement of the carriage 23 and spindle 4 at the opposite ends of any single winding layer although the arrangement may be otherwise if so desired.

In the Fig. 3 position of the winding machine a clutch latch solenoid coil 62 is in its de-energized condition whereby a clutch latch solenoid armature 63 is free to fall downwardly due to gravity. Downward motion of armature 63 causes clutch latch 20 to move clockwise. When the clutch pedal 6 is depressed a rod 64 and a clutch latch collar 65 are moved downwardly. When an operator removes his foot from the clutch pedal 6 the clutch 3 will remain in the engaged position inasmuch as the clutch latch 20 will engage the upper end edge of collar 65 and retain the clutch pedal 6 in its depressed condition against the upwardly biasing action of spring 7.

In the Fig. 3 position of the winding machine the winding arbor 38 is rotating clockwise when viewed from the right, and a rotor 72 of the metering pump 45 is simultaneously rotating in a clockwise direction due to the positive sprocket wheel and chain drive connection between the metering pump 45 and the spindle 4. The pressure pump 47 which is driven by the motor 48 is capable of transferring liquid from a reservoir 66 through a pressure relief valve 67 and conduit 68 to a conduit 75 connected to the outlet side of metering pump 45 behind an electrically operated hydraulic reversing valve 74. The pressure relief valve 67 has a valve element biased downwardly by a spring which can be calibrated to permit the valve element to be lifted off its seat only above a predetermined pressure. When the hydraulic system is at its predetermined pressure the pressure pump 47 will not increase the pressure of the hydraulic system but instead will raise the valve element of the pressure relief valve 67 against the spring thereof whereby liquid will be channelled back to the reservoir 66. However, if the pressure within the hydraulic system is below its predetermined pressure the pump 47 will supply additional liquid to the conduit 68 through valve 67. The metering pump 45, which is an article that can be procured on the commercial market, is illustrated as comprising a sliding circular yoke member 69 which can be moved offcenter with respect to the housing bore 70 by manipulation of the control knob 46. The metering pump 45 has a plurality of pistons 71 which are carried by the rotor 72. As will be obvious to those skilled in the art, the quantity of liquid circulated by the metering pump per revolution is increased by moving the sliding yoke 69 offcenter with respect to the housing bore 70 in a leftward direction and is decreased by moving the sliding yoke 69 in a rightward direction. The liquid leaves the outlet side of the metering pump 45 through a conduit 73 and then flows through reversing valve 74 into conduit 75. By the term metering pump is meant any form of positive displacement pump as contrasted with other type pumps such as of the propeller or centrifugal varieties which do not have a positive displacement.

In the position of valve 74 illustrated in Fig. 3, a reversing valve solenoid coil 76 is in its de-energized condition whereby the spring of the reversing valve 74 is free to bias the reversing valve solenoid armature 77 and the valve element of the reversing valve 74 downwardly. From conduit 75 liquid flows through a conduit 78 by way of a four-way hydraulic valve 79 to the left-hand end of the hydraulic cylinder 26. Accordingly, the carriage 23 is being driven in a right-hand direction when viewing Fig. 3. The valve element of four-way valve 79 has been moved to its illustrated right-hand position by energization of a solenoid coil 80 of the four-way valve 79 which results in right-hand movement of a solenoid armature 81 of the four-way valve 79. As liquid is being circulated by the metering pump 45 into the left-hand end of the hydraulic cylinder 26 liquid is simultaneously being removed at the same rate from the right-hand end of the hydraulic cylinder 26 through a conduit 82, the four-way valve 79, a conduit 83, the reversing valve 74, and a conduit 83' back to the inlet side of the metering pump 45.

Connected to the conduit 78 is a conduit 86, and connected to the conduit 82 is a conduit 87. The conduits 86 and 87 are each connected by a conduit 88 leading back to the reservoir 66. Each of the conduits 86 and 87 has a bleeder valve 89 and 90 respectively therein. Therefore, aside from the setting of the metering pump control knob 46, right-hand traverse of the carriage 23 can be speeded up by opening of the bleeder valve 90. This will cause some of the liquid in the right-hand end of hydraulic cylinder 26 to travel through the conduits 87 and 88 back to the reservoir 66. That is, liquid is being removed more rapidly from the right-hand end of the cylinder 26 than the rate of removal for which the metering pump 45 is set. This causes a more rapid traverse of the carriage 23 in the right-hand direction because the increased rate of removal of liquid from the right-hand end of cylinder 26 is compensated for in the left-hand end of cylinder 26 by the pump 47 which is connected to the left-hand end of cylinder 26 by conduits 68 and 75, valve 79, and conduit 78. That is, the higher rate of removal of liquid from the right-hand end of cylinder 26 upon opening of valve 90 is caused to be matched by an equally higher rate of input of liquid into the left-hand end of cylinder 26 by virtue of pressure pump 47. When the valve element of valve 79 is moved to its extreme non-illustrated left-hand position the carriage 23 will move in a left-hand direction and left-hand travel of carriage 23 can be accelerated by opening of bleeder valve 89.

Additionally, the valves 89 and 90 provide means whereby the carriage 23 can be moved in either the left-hand or right-hand direction independent of rotation of the spindle 4 and consequent driving of the metering pump rotor 72. For instance, in the Fig. 3 condition of the winding machine even though the spindle 4 is stationary the carriage 23 can be moved in a right-hand direction by opening of the valve 90 to relieve the liquid pressure from the right-hand end of the cylinder 26 through conduits 87 and 88 back to reservoir 66. Simultaneously, inasmuch as rotation of pump motor 48 is independent of rotation of spindle 4, the pump 47 is pumping liquid through conduit 68, conduit 75, valve 79, and conduit 78 into the left-hand end of the hydraulic cylinder 26 whereby the carriage 23 is moved in a right-hand direction. To move the carriage 23 in a left-hand direction when the spindle 4 is not rotating valve 89 must be opened and the valve element of valve 79 must be moved to the left to interconnect conduits 75 and 82.

With winding arbor 38 turning in a clockwise direction when viewing Fig. 3 from the right and the carriage 23 moving in a right-hand direction, at the right-hand end of the winding layer the set screw 57 will close the limit switch 50'. As will be explained in greater detail hereinafter, closure of switch 50' will cause energization of a solenoid coil 91 of the four-way valve 79 and energization of the clutch latch solenoid coil 62. Energization of solenoid coil 91 causes a solenoid armature 92 of the four-way valve 79 to move the valve element of valve 79 in a left-hand direction whereby the flow of liquid into the hydraulic cylinder 26 is immediately reversed. Also, energization of solenoid coil 62 results in lifting of armature 63 whereby the clutch 3 is immediately disengaged to instantly stop rotation of the winding arbor 38 at the end of the winding layer. Immediate stoppage of the carriage 23 and turning of the arbor 38 when the right-hand end of a winding layer is reached may be desirable inasmuch as the operator may desire to insert some electrical insulation or spacers between the just wound layer and the immediately next succeeding layer to be wound. After said layer insulation or spacers are inserted and clutch 3 is re-engaged liquid will flow from the outlet side of metering pump 45 to conduit 73, reversing valve 74, conduit 75, four-way valve 79, and conduit 82 into the right-hand end of the cylinder 26. Simultaneously liquid will be circulated from out of the left-hand end of cylinder 26 through conduit 78, four-way valve 79, conduit 83, reversing valve 74, and conduit 83' back to the inlet side of the metering pump 45. If it is desired to speed up left-hand travel of the carriage 23 the valve 89 may be opened. Loss of hydraulic liquid from the hydraulic system back to the reservoir 66 by virtue of opening of valve 89 will be replenished at the right-hand end of cylinder 26 by the pressure pump 47. After the left-hand end of the winding layer is reached the set screw 57 will actuate the limit switch 50 which will result in energization of the solenoid coils 80 and 62. Energization of the solenoid coil 62 causes lifting of the armature 63 and disengagement of the clutch 3 whereby the winding arbor 38 immediately stops rotating. Energization of the solenoid coil 80 causes the armature 81 and the valve element of the four-way valve 79 to move immediately to the right whereby the carriage 23 will now move in a right-hand direction when the clutch 3 is re-engaged.

Referring now also to Fig. 4, illustrated therein is the electrical circuit for operating the winding machine. After the operator sets the metering pump control knob 46 for the desired number of spindle turns per unit distance of carriage travel and operates the crank handle 54 to adjust the limit switches 50 and 50' for the desired layer length a spring biased button 101' of a forward start switch 101 can be depressed which will start the pump motor 48 and motor 2 rotating. Depression of the button 101' causes energization of solenoid coil 102 through an electrical circuit traced from one side or line 104 of a current supply circuit, a closed stop switch 105, the left-hand closed contacts of a reverse start switch 106, the right-hand closed contacts of switch 101, solenoid coil 102, and thence to another side or line 107 of said current supply circuit. Energization of solenoid coil 102 causes lifting of the armature associated therewith and closure of contacts 108, 109, and 110. Closure of contacts 108 causes energization of pump motor 48 from the lines 111 and 112 of a power supply circuit, and closure of contacts 110 results in energization of the arbor driving motor 2 for forward rotation. Closure of contacts 109 completes a holding or seal-in connection around the momentarily closed contacts of switch 101 whereby the armature associated with solenoid coil 102 remains raised even though the depressed button 101' of forward start switch 101 is released. That is, motors 48 and 2 keep running even though the button 101' of switch 101 is released.

The operator may desire to inch the carriage along in stop and go fashion to the left-hand end of the winding arbor 38 to properly commence winding a coil layer. To do this a jog button 113 is depressed to close a contact 114 and a switch arm 115 to energize the clutch latch trip solenoid coil 62 to ensure that the armature 63 thereof is locked in the raised position whereby the clutch 3 remains engaged only so long as the operator retains his foot on the clutch pedal 6. Closure of contact 114 and switch arm 115 completes an electrical circuit therethrough from line 104 and solenoid coil 62 to line 107. The carriage 23 will move in a left or right-hand direction when clutch pedal 6 is depressed depending upon which one of two spring biased push buttons 116' and 117' of right and left-hand carriage travel switches 116 and 117 respectively is depressed. Depression of the button 116' of switch 116 results in energization of a solenoid coil 118 through a circuit traced from line 104, switch 116, solenoid coil 118, and line 107. Energization of solenoid coil 118 results in lifting of the armature associated therewith and closure of the contacts 120 associated therewith. When contacts 120 are closed solenoid coil 80 of the four-way valve 79 is energized whereby the armature 81 drives the valve element of four-way valve 79 to the position illustrated in Fig. 3. In this condition of the electrical control circuit when the clutch pedal 6 is depressed the carriage 23 moves towards the right. If the operator desires to move the carriage 23 towards the left the push button 117' of switch 117 must be depressed which will result in energization of solenoid coil 121 through a circuit traced from line 104, switch 117, solenoid coil 121, and line 107. When solenoid coil 121 is energized the armature associated therewith is raised and contacts 122 associated therewith are closed. When contacts 122 are closed solenoid coil 91 of the four-way valve 79 is energized from lines 104 and 107 whereby the armature 92 is driven towards the left so that when clutch pedal 6 is depressed the carriage 23 will travel in a left-hand direction. It should be noted that the just described reversal by depression of the button 117' of switch 117 can be obtained instantaneously when the carriage 23 is traveling in a right-hand direction without stoppage of carriage 23 by retention of the operator's foot on clutch pedal 6 to keep clutch 3 engaged.

During the initial aligning operation the arbor 38 need not be rotated while the carriage 23 is being moved. That is, the carriage 23 can be moved by the pressure pump 47 by operation of the bleeder valves 89 and 90 and the switches 117 and 116 respectively without depression of the clutch pedal 6 and consequent engagement of clutch 3 and rotation of spindle 4. This last-mentioned manner of controlling movement of carriage 23 is very useful in the situation where the conductor 39 is attached to or partially wound about the winding arbor 38, and if it is desired to make an adjustment in the positioning of the carriage 23 either during the initial alignment thereof or after the actual winding operation has been commenced.

With the carriage 23 properly aligned with the left-hand end of the winding arbor 38, and with the buttons of switches 101 and 116 having been depressed the actual winding of a layer can be commenced. The operator can start winding by jogging the pedal 6 by leaving the button 113 depressed, or he can lock the pedal 6 in the engaged run position by depressing a run button 130 which will break contact between contact 114 and arm 115. Such contact interruption causes de-energization of solenoid coil 62 whereby the armature 63 associated therewith drops down by gravity. When the pedal 6 is depressed the latch 20 will hold the clutch 3 in engaged position even though the operator removes his foot from pedal 6.

After several turns have been wound on the arbor 38 the operator will be able to see if the proper setting of knob 46 has been obtained to get the desired relationship of turns of arbor 38 per unit distance of travel of the carriage 23 for the particular coil being wound and the desired compactness of adjacent turns of the coil. Assuming said relationship has not been obtained the operator may desire to unwind the incorrectly wound turns on the arbor 38 in the event he cannot manually correct their disposition on the arbor 38.

To unwind, the push button 106' of reverse start switch 106 must be depressed. This causes de-energization of solenoid coil 102 and opening of contacts 108, 109, and 110. However, motor 48 does not cease running since depression of the button 106' of switch 106 causes energization of solenoid coil 131 and closure of contacts 132, 133, 134, and 135. Energization of solenoid coil 131 is accomplished by virtue of a circuit traced along line 104, closed stop switch 105, the closed left-hand contacts of switch 101, the closed right-hand contacts of switch 106, solenoid coil 131, and line 107. Also, solenoid coil 131 remains energized even though the button 106' of switch 106 is released since with contacts 133 closed during momentary closure of switch 106 a holding or seal-in connection around the momentarily closed contacts of switch 106 is completed. When contacts 132 are closed the pressure pump motor 48 is still energized from lines 111 and 112, and when contacts 134 are closed arbor driving motor 2 is energized for reverse rotation.

When contacts 135 are closed the solenoid coil 76 for reversing valve 74 is energized whereby the armature 77 and valve element thereof are raised against the downward biasing action of the spring thereof. It will be noted that when the arbor or spindle driving motor 2 is reversed the direction of rotation of metering pump rotor 72 is reversed also from that direction of rotation illustrated in Fig. 3 since the metering pump rotor 72 is positively driven by the spindle 4. This means that the inlet and outlet sides of the metering pump have been reversed. Therefore, the reversing valve 74 reverses the connections of conduits 75 and 83 to the metering pump 45 so that switches 116 and 117 still control right and left-hand movement respectively of the carriage 23, as well as ensuring that conduit 68 is connected to the outlet side of pump 45 so that the valves 89 and 90 and pump 47 will be effective to speed up the carriage 23 when the spindle 4 is rotating. It will be obvious to those skilled in the art that the drive means between spindle 4 and metering pump 45 can be such whereby when the spindle 4 is reversed the metering pump rotor 72 will continue to turn in the same direction in which event the reversing valve 74 can be omitted.

After the incorrectly wound turns have been unwound winding can be commenced by depression of the buttons of forward start switch 101 and right-hand carriage travel switch 116, run button 130, and pedal 6. When the carriage has run out to the right-hand end of the first winding layer the set screw 57 will strike the limit switch 50' and close the contacts thereof. Solenoid 121 will be energized when limit switch 50' is closed. Energization of solenoid coil 121 causes closure of contacts 140 as well as 122. When contacts 122 are closed the solenoid 91 is energized to reverse the direction of carriage travel. However, simultaneously closure of contacts 140 causes energization of solenoid coil 62 whereby the clutch 3 is immediately disengaged to stop rotation of arbor 38. This means that the carriage 23 is immediately stopped at the end of the first winding layer without any dwell or delay and without any piling or binding of the end turns. If contacts 140 were omitted obviously the machine would immediately start winding the second layer without any stoppage and it is contemplated that sometimes this will be done. However, such stoppage is sometimes desirable since the operator may desire to insert layer insulation or spacers between the first and second layers. After said layer insulation or spacers are inserted and pedal 6 is depressed the carriage will travel in a left-hand direction and switch 50' will be opened to de-energize solenoid coil 62 before the operator can remove his foot from the pedal 6 whereby the machine will remain in a left-hand run condition. When the carriage 23 reaches the left-hand end of the second layer the set screw 57 will strike the limit switch 50 to close the contacts thereof. Closure of the limit switch 50 results in energization of solenoid coil 118. When solenoid coil 118 is energized contacts 141 and 120 are closed. Closure of contacts 120 results in energization of solenoid coil 80 whereby the valve element of four-way valve 79 is immediately placed in the condition shown in Fig. 3. Also though, closure of contacts 141 causes energization of solenoid coil 62 and stoppage of the machine so the operator may insert layer insulation or spacers between the second and third layers. When pedal 6 is depressed the carriage 23 will move towards the right and set screw 57 will disengage limit switch 50 before the operator can remove his foot from pedal 6 whereby the carriage will run to the right-hand end of the third layer. If no stoppage is desired between the second and third layers the contacts 141 can be omitted.

It should be noted that reversal of the carriage 23 can be obtained before the ends of the winding layers are reached by operation of buttons 116' and 117'. For instance, if the carriage 23 is traveling toward the right it can be reversed before the right-hand end of the winding layer is reached by depression of button 117', and if the carriage 23 is traveling toward the left it can be reversed before the left-hand end of the winding layer is reached by depression of the button 116'. Such instantaneous reversal short of the ends of a winding layer is useful in correcting looseness between adjacent turns, despite a correct setting of knob 46, due to such a factor as non-uniform insulation on the electrical conductor being wound. If the turns are being wound too loose when the carriage is moving toward the right such looseness can be corrected by first pushing button 117' and then button 116' in rapid succession while keeping the clutch pedal 6 depressed. This has the effect of momentarily slowing down right-hand travel of the carriage 23 during winding. If the carriage is traveling toward the left momentary slowing down of the carriage can be obtained by depressing buttons 116' and 117' in rapid succession while keeping clutch pedal 6 depressed. Of course, if adjacent turns are being crowded this can be corrected during winding without stopping the winding operation by momentarily speeding up the carriage 23 by operation of valves 89 and 90.

Stop switch 105 is for the purpose of completely stopping the winding machine. That is, depression of the spring biased button 105' of stop switch 105 will de-energize the motors 2 and 48 and stop the pumps 45 and 47. The buttons for switches 101, 105, 106, 116, and 117 as well as jog and run buttons 113 and 130 respectively and bleeder valves 89 and 90 are positioned on the right-hand side wall of the housing 1 where they will be convenient to the operator.

While there has been shown and described a particular embodiment of the invention it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. In a winding machine, a rotary spindle, a guide carriage mounted for straight line motion parallel to the axis of said spindle, a positive displacement hydraulic system interconnecting said spindle and said carriage so as to maintain direct proportionality between angular motion of said spindle and translatory motion of said carriage, said positive displacement hydraulic system comprising a positive displacement hydraulic pump which is driven by said spindle and a positive displacement actuator which drives said carriage with the actuator being hydraulically connected to said displacement pump for actuation thereby, a hydraulic pressure pump, and said hydraulic system maintained under a predetermined hydraulic pressure by said hydraulic pressure pump, and means for imparting translatory motion to said carriage without angular motion of said spindle comprising means for driving said pressure pump independent of rotation of said spindle.

2. In a winding machine having a rotary spindle and a guide carriage mounted for straight line motion parallel to the axis of said spindle, a positive displacement hydraulic system interconnecting said spindle and said carriage so as to maintain direct proportionality between angular motion of said spindle and translatory motion of said carriage comprising a positive displacement hydraulic pump driven by said spindle, a positive displacement double acting hydraulic actuator in hydraulic communication with said displacement pump for actuation thereby, said actuator being connected in drive relationship with said carriage, a hydraulic pressure pump, and said hydraulic system being filled with a pressure liquid by said hydraulic pressure pump, means for reversing the direction of rotation of said spindle and hydraulic valve means for reversing the direction of motion of said carriage, and means for moving said carriage without rotation of said spindle comprising hydraulic valve means hydraulically connected to said actuator and drive means for said pressure pump independent of rotation of said spindle.

3. In a winding machine, a rotary spindle, a guide carriage mounted for straight line motion parallel to the axis of rotation of said spindle, a double acting positive displacement hydraulic actuator for moving said carriage, a positive displacement hydraulic pump hydraulically connected to said actuator by hydraulic conduit means, a hydraulic pressure pump and said conduit means, displacement pump, and actuator filled with an incompressible liquid by said hydraulic pressure pump, common means for positively driving both said spindle and said displacement pump whereby translatory motion of said carriage is directly proportional to angular motion of said spindle, means for reversing direction of rotation of said spindle and hydraulic valve means for reversing direction of motion of said carriage, means for adjusting the volume displacement of said displacement pump independently of said spindle rotation for varying said direct proportionality, and means for accelerating said carriage independent of said adjusting means comprising hydraulic bleeder valve means hydraulically connected to said actuator and said pressure pump.

4. In a winding machine, a rotary spindle, a guide carriage mounted for straight line motion parallel to the axis of rotation of said spindle, a double acting positive displacement hydraulic actuator for moving said carriage, a positive displacement hydraulic pump hydraulically connected to said actuator by hydraulic conduits, said conduits, pump, and actuator filled with an incompressible liquid, common means for positively driving both said spindle and said pump whereby translatory motion of said carriage is directly proportional to angular motion of said spindle, and means for accelerating said carriage without accelerating said spindle comprising a hydraulic pressure pump connected to said conduit means and hydraulic bleeder valve means hydraulically connected to said actuator.

5. A hydraulic system for driving a movable member comprising a hydraulic cylinder having a piston therein, a hydraulic positive displacement pump having the inlet and outlet sides thereof connected to opposite ends of said cylinder by hydraulic conduits, a hydraulic pressure pump, and said cylinder, displacement pump, and conduits being filled with a liquid at a predetermined pressure by said hydraulic pressure pump, said pressure pump being connected to one of said conduits adjacent said outlet side, said piston movable within said cylinder by circulation of said liquid from one of said opposite ends into the other of said opposite ends by and through said displacement pump, a hydraulic bleeder valve connected to the other of said conduits for bleeding liquid from said one opposite end, means for moving said piston in one direction when said positive displacement pump is inoperative, said means comprising said hydraulic pressure pump and said hydraulic bleeder valve, and means for transmitting movement of said piston to said movable member.

6. A hydraulic system for driving a movable member comprising a hydraulic cylinder having a piston therein, said cylinder having a uniform internal diameter, a piston rod extending from opposite sides of said piston through opposite ends of said cylinder, said opposite side rods having equal external dimensions, a hydraulic positive displacement pump having the inlet port thereof connected to one of said opposite ends by a hydraulic conduit and the outlet port thereof connected to the other of said opposite ends by another hydraulic conduit, a hydraulic pressure pump, and said cylinder, displacement pump, and conduits being filled with a liquid at a predetermined pressure by said hydraulic pressure pump and said piston movable at a predetermined rate towards said one opposite end by circulation of said liquid at a predetermined rate from said one opposite end to said other opposite end by and through said displacement pump, and means for accelerating said predetermined piston rate comprising a hydraulic valve for by-passing liquid from said one opposite end to a reservoir of said liquid and said pressure pump connected to said reservoir and said another conduit.

7. In a machine having a rotary spindle and a carriage movable parallel to the axis of said spindle, means for moving said carriage with rotation of said spindle comprising a positive displacement pump driven by said spindle and a cylinder having a double acting piston therein with the opposite ends of said cylinder connected to the inlet and outlet sides of said pump by conduits, a pressure pump, and said displacement pump, cylinder, and conduits being filled with a pressure liquid by said pressure pump, said piston movable with rotation of said spindle by circulation of said pressure liquid from out one of said opposite ends into the other of said opposite ends by said displacement pump, and means for moving said piston without rotation of said spindle comprising means for driving said pressure pump independent of rotation of said spindle, valve means for bleeding said liquid from said one opposite end, and means connecting said pressure pump to a reservoir of said liquid and said other opposite end.

8. A hydraulic actuating system comprising a hydraulic cylinder having a double acting piston therein, opposite ends of said cylinder connected to the inlet and outlet ports of a hydraulic positive displacement pump by hydraulic conduits, means for driving said displacement pump; a hydraulic pressure pump, and said displacement pump, cylinder, and conduits filled with an incompressible liquid at a predetermined pressure by said hydraulic pressure pump, said pressure pump being connected to said system adjacent said outlet port through a hydraulic pressure relief valve connected to the outlet port of said pressure pump, the inlet port of said pressure pump connected to a reservoir of said liquid, said pressure pump driven by means independent of said displacement pump drive means, said piston movable towards one end of said cylinder by circulation of said liquid from out said one cylinder end into the other end of said cylinder by and through said displacement pump, means for instantaneously reversing the direction of movement of said piston comprising hydraulic valve means for reversing said conduit connections between said cylinder and said displacement pump, and means for moving said piston independent of operation of said displacement pump comprising said pressure pump and hydraulic valve means for placing either of said opposite ends in communication with said reservoir.

9. In a winding machine for winding elongated material in a plurality of layers on a winding form, said form turned by a rotary spindle, said material guided along said form by a carriage movable generally parallel to the axis of rotation of said form, said carriage driven by a hydraulic system comprising a uniform internal diameter cylinder having a double acting piston therein, opposite ends of said cylinder connected to opposite sides of a positive displacement pump by conduits and reversing valve means, electrical switch means for automatically instantaneously reversing said carriage at the ends of said layers and at any other time by actuation of said reversing valve means, said displacement pump driven by said spindle, a pressure pump, and said cylinder, displacement pump, and conduits filled with a liquid at a predetermined pressure by said pressure pump, said pressure pump being connected at the inlet side thereof to a source of said liquid and at the outlet side thereof to the outlet side of said displacement pump through a pressure relief valve, said carriage driven by said displacement pump by circulation of said liquid from out one end of said cylinder into the other end thereof, electrical switch means for reversing the direction of rotation of said spindle at any time, means for adjustably setting the rate of circulation of said liquid by said displacement pump independently of said spindle rotation whereby the ratio of spindle turns to unit distance of carriage travel can be varied over a wide range, means for accelerating the rate of travel of said carriage aside from the setting of said displacement pump comprising said pressure pump and valve means for bleeding said liquid from either end of said cylinder, and means for moving said carriage without rotation of said spindle comprising means for driving said pressure pump independent of rotation of said spindle and said last mentioned valve means.

10. In a winding machine, a rotary spindle, a guide carriage mounted for straight line motion parallel to the axis of said spindle, and a positive displacement hydraulic system interconnecting said spindle and said carriage so as to at all times maintain direct proportionality between angular motion of said spindle and translatory motion of said carriage, and said machine having means for moving said carriage independent of rotation of said spindle comprising hydraulic valve means and hydraulic pressure pump means hydraulically connected to said hydraulic system, and means for driving said pressure pump means independent of rotation of said spindle.

11. In a winding machine, a rotary spindle, a guide carriage mounted for straight line motion parallel to the axis of said spindle, and a positive displacement hydraulic system interconnecting said spindle and said carriage so as to at all times maintain direct proportionality between angular motion of said spindle and translatory motion of said carriage, and said machine having means for accelerating translatory motion of said carriage without accelerating angular motion of said spindle comprising hydraulic valve means and hydraulic pressure pump means hydraulically connected to said hydraulic system, and means for driving said pressure pump means independent of rotation of said spindle.

References Cited in the file of this patent

UNITED STATES PATENTS

| | | |
|---|---|---|
| 1,140,924 | Underhill | May 25, 1915 |
| 1,641,300 | Spencer | Sept. 6, 1927 |
| 1,937,077 | West | Nov. 28, 1933 |
| 2,092,721 | Arter | Sept. 7, 1937 |
| 2,190,529 | Bretschneider | Feb. 13, 1940 |
| 2,232,317 | Douglas | Feb. 18, 1941 |
| 2,312,337 | Hughes | Mar. 2, 1943 |
| 2,357,821 | Harrington et al. | Sept. 12, 1944 |
| 2,497,608 | Herrstrum | May 15, 1947 |
| 2,500,797 | Bullard | Mar. 14, 1950 |
| 2,573,938 | Tyler et al. | Nov. 6, 1951 |
| 2,575,385 | Killoran | Nov. 20, 1951 |
| 2,622,372 | Moulden | Dec. 23, 1952 |
| 2,648,312 | Tucker | Aug. 11, 1953 |
| 2,670,144 | Johnson | Feb. 23, 1954 |
| 2,728,194 | Clark | Dec. 27, 1955 |
| 2,799,138 | Dornhofer | July 16, 1957 |